(12) United States Patent
Seubert et al.

(10) Patent No.: US 11,491,907 B2
(45) Date of Patent: Nov. 8, 2022

(54) VERTICAL RESTRAINT WITH CHAMFERRED PROFILE

(71) Applicant: GOODRICH CORPORATION, Charlotte, NC (US)

(72) Inventors: Christopher P. Seubert, Jamestown, ND (US); Kruse Otto, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 186 days.

(21) Appl. No.: 16/902,718

(22) Filed: Jun. 16, 2020

(65) Prior Publication Data
US 2021/0387562 A1 Dec. 16, 2021

(51) Int. Cl.
*B60P 7/08* (2006.01)
*B60P 7/13* (2006.01)
*B64D 9/00* (2006.01)

(52) U.S. Cl.
CPC ............... *B60P 7/13* (2013.01); *B64D 9/003* (2013.01)

(58) Field of Classification Search
CPC ...... B60P 7/13; B60P 7/10; B60P 7/18; B60P 7/0892; B64D 9/003
USPC .................................. 410/69, 77, 78, 79, 80
See application file for complete search history.

(56) References Cited

U.S. PATENT DOCUMENTS

| | | | |
|---|---|---|---|
| 4,557,648 A * | 12/1985 | Koch | B60P 7/13 410/79 |
| 4,697,967 A | 10/1987 | Schulz et al. | |
| 5,310,297 A | 5/1994 | Benjamin | |
| 6,039,519 A | 3/2000 | Jones et al. | |
| 7,435,043 B2 | 10/2008 | Brekken et al. | |
| 8,496,205 B2 | 7/2013 | Moradians et al. | |
| 2002/0119022 A1* | 8/2002 | Gilhuys | B64D 9/003 410/77 |
| 2007/0086871 A1* | 4/2007 | Brekken | B64D 9/003 410/77 |
| 2013/0168494 A1* | 7/2013 | Moradians | B64D 9/003 410/69 |
| 2013/0334367 A1 | 12/2013 | Larson et al. | |
| 2019/0248269 A1 | 8/2019 | Shivalinga et al. | |

FOREIGN PATENT DOCUMENTS

GB 2440064 1/2008

OTHER PUBLICATIONS

European Patent Office, European Search Report dated Nov. 8, 2021 in Application No. 21179545.5.

* cited by examiner

*Primary Examiner* — Stephen T Gordon
(74) *Attorney, Agent, or Firm* — Snell & Wilmer L.L.P.

(57) ABSTRACT

A restraint for use in restraining cargo includes a main body having an elongated shape with a contact end configured to contact and restrain the cargo and a second end opposite the contact end, the contact end defining a first face and a second face such that a first angle between the first face and the second face is at least one of less than or equal to 160 degrees. The restraint further includes a spring configured to allow the main body to rotate relative to a stationary object in response to contact with the cargo and to cause the main body to return to a neutral position in response to a lack of contact with the cargo.

20 Claims, 3 Drawing Sheets

VERTICAL RESTRAINT WITH CHAMFERRED PROFILE

FIELD

The present disclosure relates to vertical cargo restraints and, more particularly, to vertical cargo restraints that reduce interference between the restraint and cargo.

BACKGROUND

Aircraft may transport cargo. These aircraft may include various restraints for restraining the cargo during taxi, takeoff, and landing. The restraints may restrain cargo in any one or more direction. For example, a first type of restraint may restrain cargo along a longitudinal axis of the aircraft, another type of restraint may restrain cargo along a width of the aircraft, and yet another restraint may restrain cargo along a vertical direction. This latter type of restraint may be referred to as a vertical restraint.

Vertical restraints may reside in a home, or neutral, position and have the freedom to rotate out of this position to allow for loading and unloading of relatively large items of cargo. If counter rotation of these vertical restraints is greater than a predetermined amount of rotation, an interference condition may be created between the cargo and the vertical restraint. Such interference may lead to wear of the vertical restraint as well as increased lateral loads on the restraint that may restrict movement of the cargo.

SUMMARY

Disclosed herein is a restraint for use in restraining cargo. The restraint includes a main body having an elongated shape with a contact end configured to contact and restrain the cargo and a second end opposite the contact end, the contact end defining a first face and a second face such that a first angle between the first face and the second face is at least one of less than or equal to 160 degrees. The restraint further includes a spring configured to allow the main body to rotate relative to a stationary object in response to contact with the cargo and to cause the main body to return to a neutral position in response to a lack of contact with the cargo.

Any of the foregoing embodiments may further include a pin, wherein the main body includes a central opening configured to receive the pin such that the main body is configured to rotate about the pin.

In any of the foregoing embodiments, the main body defines a pocket between the contact end and the central opening to reduce a moment of inertia during rotation of the main body.

In any of the foregoing embodiments, the main body further defines an aperture extending through the main body in the pocket to facilitate draining of fluid from the pocket.

In any of the foregoing embodiments, the main body and the spring are configured to rotate past the neutral position in response to the lack of contact with the cargo to a maximum rotation position that is at least one of less than or equal to 49.5 degrees.

In any of the foregoing embodiments, the first face is configured to form a second angle that is between 75 degrees and 105 degrees relative to a line that is perpendicular to a longitudinal axis of the main body in the neutral position in response to the main body being in the maximum rotation position.

In any of the foregoing embodiments, the second angle is between 80 degrees and 100 degrees.

In any of the foregoing embodiments, a contact distance from an intersection of the first face and the second face to a center of the central opening is greater than a second distance from the center of the central opening to the second end.

In any of the foregoing embodiments, the contact distance is 2 inches plus or minus 10 percent.

In any of the foregoing embodiments, the contact end has a different shape than the second end.

In any of the foregoing embodiments, the first face forms a third angle with a line that is perpendicular to a longitudinal axis of the main body that is 39 degrees plus or minus 10 percent.

In any of the foregoing embodiments, the main body is formed using a stainless steel.

Also disclosed is a restraint for use in restraining cargo. The restraint includes a main body having an elongated shape with a contact end configured to contact and restrain the cargo, a second end opposite the contact end, and a central opening, the contact end defining a first face and a second face such that a first angle between the first face and the second face is at least one of less than or equal to 160 degrees. The restraint further includes a spring configured to allow the main body to rotate relative to a stationary object in response to contact with the cargo and to cause the main body to return to a neutral position in response to a lack of contact with the cargo. The restraint further includes a pin configured to extend through the central opening such that the main body is configured to rotate about the pin, wherein a contact distance from an intersection of the first face and the second face to a center of the central opening is greater than a second distance from the center of the central opening to the second end, and wherein the main body defines a pocket between the contact end and the central opening to reduce a moment of inertia during rotation of the main body.

In any of the foregoing embodiments, the main body further defines an aperture extending through the main body in the pocket to facilitate draining of fluid from the pocket.

In any of the foregoing embodiments, the main body and the spring are configured to rotate past the neutral position in response to the lack of contact with the cargo to a maximum rotation position that is at least one of less than or equal to 49.5 degrees.

In any of the foregoing embodiments, the first face is configured to form a second angle that is between 75 degrees and 105 degrees relative to a line that is perpendicular to a longitudinal axis of the main body in the neutral position in response to the main body being in the maximum rotation position.

In any of the foregoing embodiments, the second angle is between 80 degrees and 100 degrees.

In any of the foregoing embodiments, the contact distance is 2 inches plus or minus 10 percent.

In any of the foregoing embodiments, the first face forms a third angle with a line that is perpendicular to a longitudinal axis of the main body that is 39 degrees plus or minus 10 percent.

Also disclosed is a restraint for use in restraining cargo. The restraint includes a main body having an elongated shape with a contact end configured to contact and restrain the cargo, a second end opposite the contact end, and a central opening, the contact end defining a first face and a second face such that a first angle between the first face and the second face is at least one of less than or equal to 160 degrees. The restraint further includes a spring configured to allow the main body to rotate relative to a stationary object in response to contact with the cargo and to cause the main body to return to a neutral position in response to a lack of contact with the cargo. The restraint further includes a pin configured to extend through the central opening such that the main body is configured to rotate about the pin, wherein a contact distance from an intersection of the first face and the second face to a center of the central opening is greater than a second distance from the center of the central opening to the second end, and wherein the first face forms a third angle with a line that is perpendicular to a longitudinal axis of the main body that is 39 degrees plus or minus 10 percent.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
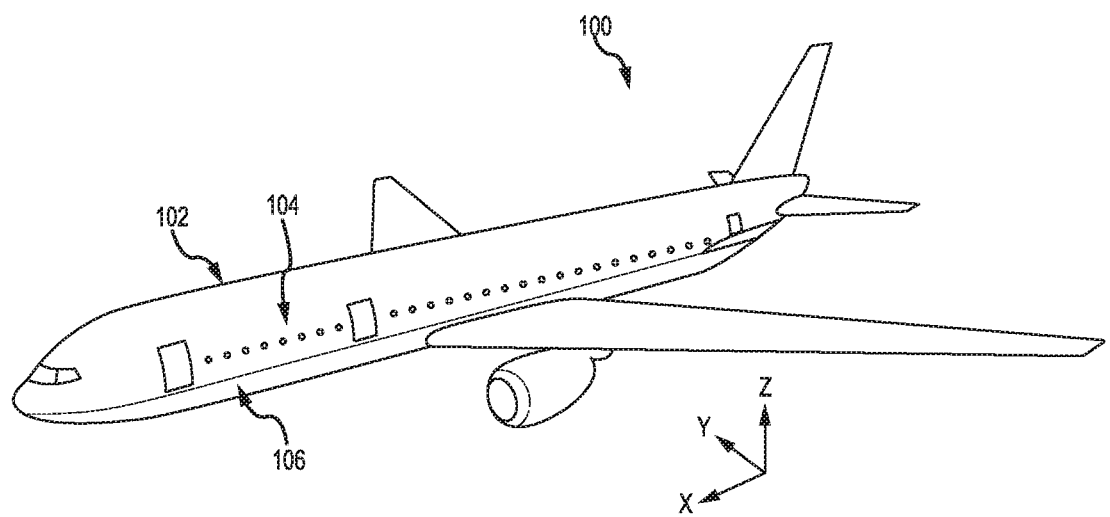
FIG. 1 illustrates an aircraft having a passenger compartment and a cargo compartment, in accordance with various embodiments.

Referring now to FIG. 1, an aircraft 100 may include a fuselage 102. The fuselage 102 may define a passenger compartment 104 and a cargo compartment 106. In various embodiments, the passenger compartment 104 may be replaced with a second cargo compartment. An X-Y-Z axis is shown throughout the drawings to illustrate the relative orientation of components.

Figure 2:
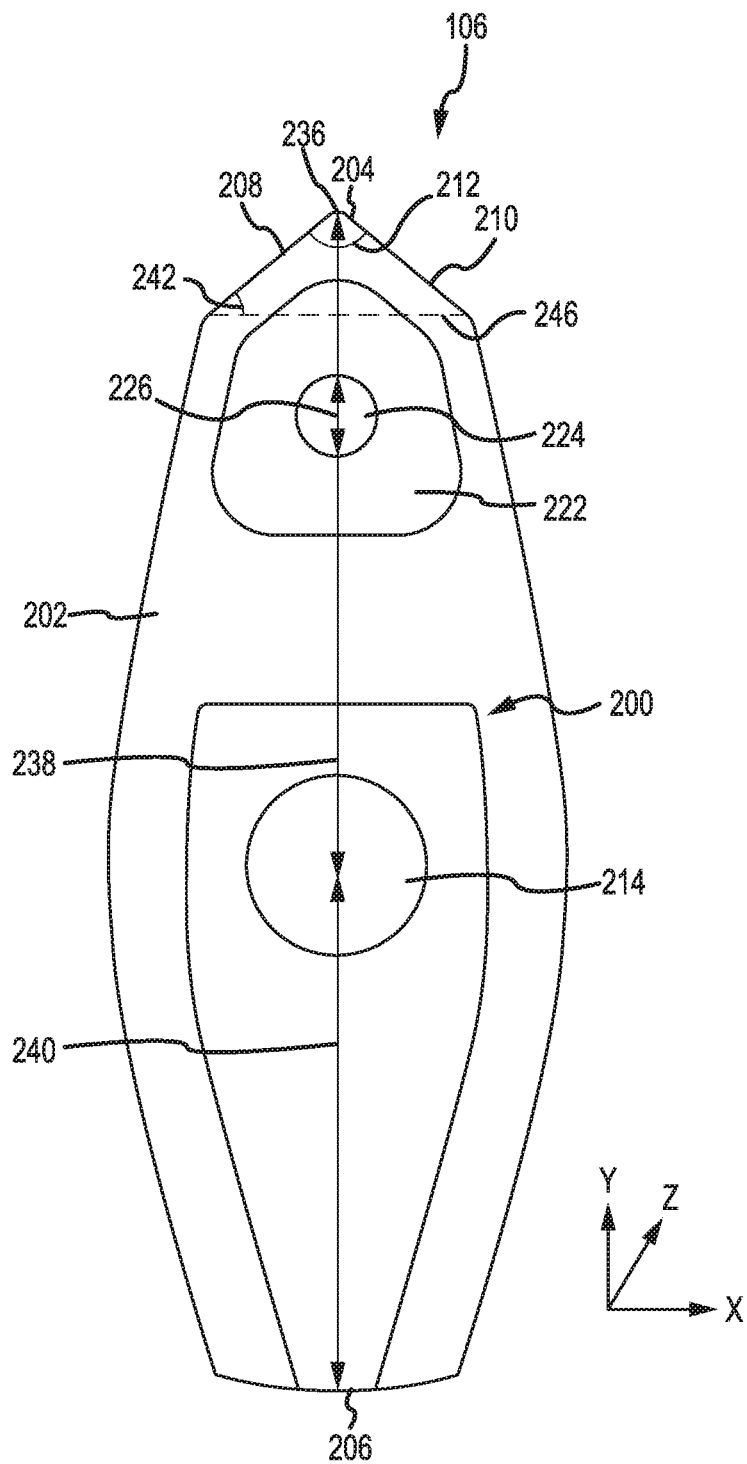
FIG. 2 illustrates a vertical restraint for use in the cargo compartment of FIG. 1, in accordance with various embodiments.
Figure 3:
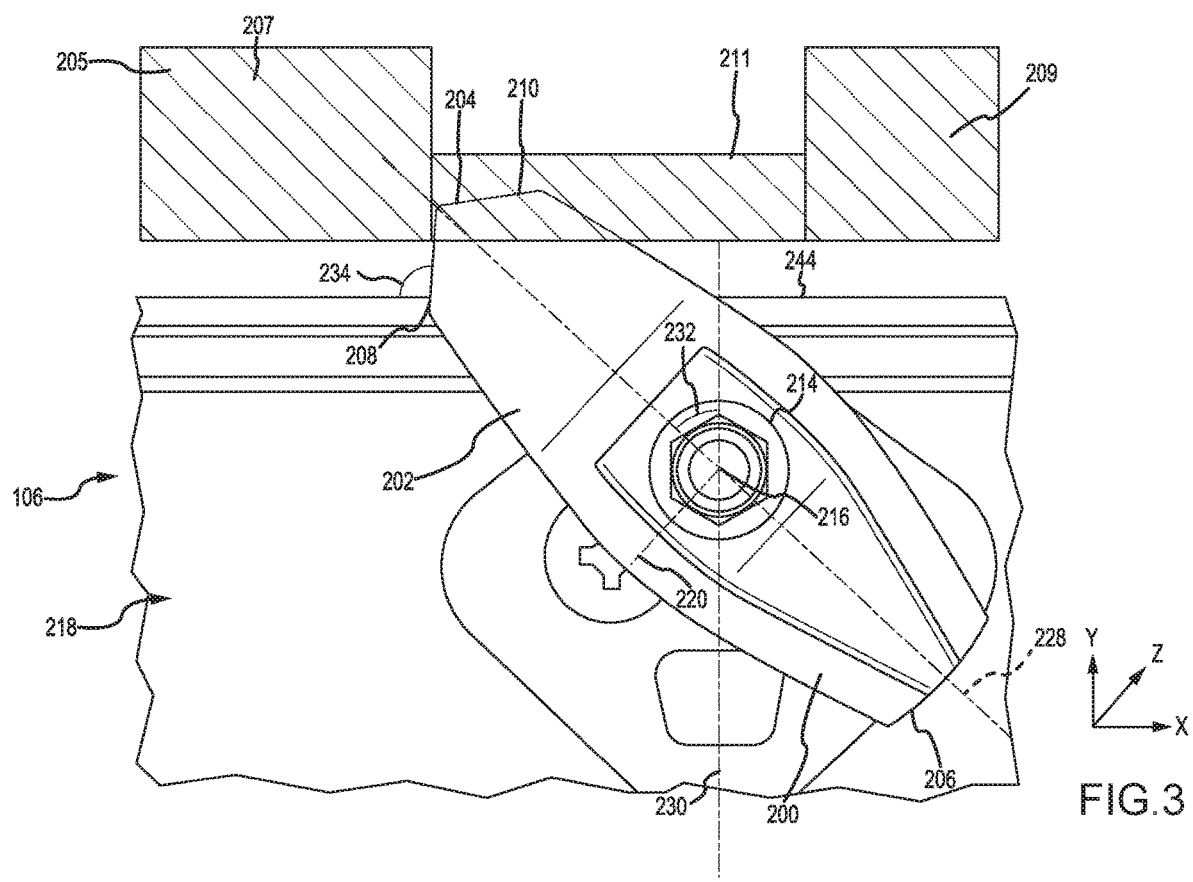
FIG. 3 illustrates the vertical restraint of FIG. 2 as installed in a cargo compartment, in accordance with various embodiments.

Referring now to FIGS. 2 and 3, a restraint 200, also referred to as a Z-restraint or vertical restraint, may be installed in the cargo compartment 106 to restrain cargo along the Z, or vertical, direction. The restraint 200 has a main body 202. The main body 202 may be formed from a relatively hard material such as a metal. In various embodiments, the main body 202 may be formed from a stainless steel.

The main body 202 may have an elongated shape and may have a contact end 204 designed to contact a piece of cargo (e.g., a piece of cargo 205) and a second end 206 opposite the contact end 204. The contact end 204 may include a first face 208 and a second face 210 that meet at an intersection 236. The first face 208 and the second face 210 may contact the cargo 205 as it moves along the X direction. An angle 212 may exist between the first face 208 and the second face 210. In various embodiments, the angle 212 may be less than or equal to 160 degrees (160°, e.g., between 0° and 160°), less than or equal to 140° (e.g., between 0° and 140°), less than or equal to 120° (e.g., between 0° and 120°), or about 90°. Where used in this context, about refers to the referenced value plus or minus 10 percent (10%) of the referenced value.

The main body 202 may define or include a central opening 214 located between the contact end 204 and the second end 206. The central opening 214 is designed to receive a pin 216 that is used to couple the main body 202 to a component, such as a cargo floor 218. The main body 202 may rotate about the pin 216. A spring 220 may be coupled to the main body 202 and may be designed to facilitate partial rotation of the main body 202 relative to the cargo floor 218 in response to contact between the main body 202 and the cargo 205, and to return the main body 202 to a neutral position in response to a lack of contact with the cargo 205. The main body 202 may have a longitudinal axis 228 extending from the contact end 204 to the second end 206. The main body 202 may be symmetrical about the longitudinal axis 228. The longitudinal axis 228 may extend in a direction parallel to the Y axis, as shown by a line 230, in response to the main body 202 being in the neutral position.

The main body 202 may define or include a pocket, or recess, 222 located between the central opening 214 and the contact end 204. The pocket 222 is used to reduce a mass of the main body 202 towards the contact end 204, thus reducing a moment of inertia of the main body 202 during rotation of the main body 202. The main body 202 may further include an aperture 224 located in the pocket 222. The aperture allows fluid that collects in the pocket 222 to drain through the other side, thus reducing degradation of the restraint 200. The aperture 224 may have an aperture diameter 226. The aperture diameter 226 may be between 0.1 inches and 0.4 inches (2.54 millimeters (mm) and 10.16 mm), between 0.2 inches and 0.3 inches (5.08 mm and 7.62 mm), or about 0.25 inches (6.35 mm).

The cargo 205 may include two or more blocks 207, 209 with a flange 211 extending therebetween. In various embodiments, cargo may include slots instead of, or in addition to, the blocks 207, 209 such that the slot interfaces with restraint 200. The first block 209 may contact the main body 202 as the cargo 205 is moving in the positive X direction. Contact between the cargo 205 and the main body 202 may force the main body 202 to rotate clockwise. In response to the block 209 passing the main body 202, the spring 220 may cause the main body 202 to rotate in the counterclockwise direction towards, and past, the neutral position. The counterclockwise rotation may extend past the neutral position to a maximum rotation position. The maximum rotation position may form an angle 232 with the neutral position (the neutral position being illustrated by the line 230). The various features of the restraint 200 (including any one or more of the pocket 222, the spring 220, the mass at the contact end 204 and the second end 206, and the different shapes of the contact end 202 and the second end 204) may cause the maximum rotation angle 232 to be between 40° and 60°, between 45° and 55°, or about 49.5°.

It is undesirable for interference between the block 207 and the contact end 204 to resist movement of the block 207 in the positive X direction. In that regard, the first face 208 may form a second angle 234 relative to a line 244 that is perpendicular to the longitudinal axis 228 in response to the main body 202 being in the neutral position. In various embodiments, the second angle 234 may be between 75° and 105°, between 80° and 100°, about 90°, or less than or equal to 90° (e.g., between 0° and 90°). This range of angles may reduce the likelihood of interference between the block 207 and the contact end 204 resisting movement of the block 207 in the positive X direction.

The first face 208 and the second face 210 may meet at an intersection 236. A contact distance 238 may extend from the intersection 236 to a center of the central opening 214. A second distance 240 may extend from the center of the central opening 214 to the second end 206. The contact distance 238 may be greater than the second distance 240. In various embodiments, the contact distance 238 may be between 1 inch and 3 inches (25.4 mm and 76.2 mm), between 1.5 inches and 2.5 inches (38.1 mm and 63.5 mm), or about 2 inches (50.8 mm).

A third angle 242 may be present between the first face 208 and a line 246 perpendicular to the longitudinal axis 228. The third angle 242 may be between 30° and 50°, between 35° and 45°, or about 39°.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A restraint for use in restraining cargo, the restraint comprising:
   a main body having an elongated shape with a contact end configured to contact and restrain the cargo and a second end opposite the contact end, the contact end including a first face and a second face that meet at an intersection, wherein a first angle between the first face and the second face is less than or equal to 160 degrees, wherein a second angle between the first face and a first line perpendicular to a longitudinal axis of the main body is between 30 degrees and 50 degrees, and wherein a third angle between the second face and the first line perpendicular to the longitudinal axis is between 30 degrees and 50 degrees, the longitudinal axis extending from the contact end to the second end of the main body; and
   a spring configured to allow the main body to rotate relative to a stationary object in response to contact with the cargo and to cause the main body to return to a neutral position in response to a lack of contact with the cargo.

2. The restraint of claim 1, further comprising a pin, wherein the main body includes a central opening configured to receive the pin such that the main body is configured to rotate about the pin.

3. The restraint of claim 2, wherein the main body defines a pocket between the contact end and the central opening to reduce a moment of inertia during rotation of the main body.

4. The restraint of claim 3, wherein the main body further defines an aperture extending through the main body in the pocket to facilitate draining of fluid from the pocket.

5. The restraint of claim 3, wherein the main body and the spring are configured to rotate past the neutral position in response to the lack of contact with the cargo to a maximum rotation position that is at least one of less than or equal to 49.5 degrees.

6. The restraint of claim 5, wherein in the maximum rotation position the first face forms a fourth angle that is between 75 degrees and 105 degrees relative to a second line, wherein the second line is perpendicular to the longitudinal axis when the main body is in the neutral position.

7. The restraint of claim 6, wherein the fourth angle is between 80 degrees and 100 degrees.

8. The restraint of claim 2, wherein a contact distance from the intersection of the first face and the second face to a center of the central opening is greater than a second distance from the center of the central opening to the second end.

9. The restraint of claim 8, wherein the contact distance is 2 inches plus or minus 10 percent.

10. The restraint of claim 1, wherein the contact end has a different shape than the second end.

11. The restraint of claim 1, wherein the second angle and the third angle are each 39 degrees plus or minus 10 percent.

12. The restraint of claim 1, wherein the main body is formed using a stainless steel.

13. A restraint for use in restraining cargo, the restraint comprising:
   a main body having an elongated shape with a contact end configured to contact and restrain the cargo, a second end opposite the contact end, and a central opening, the contact end defining a first face and a second face such that a first angle between the first face and the second face is at least one of less than or equal to 160 degrees, wherein a second angle between the first face and a first line perpendicular to a longitudinal axis of the main body is between 30 degrees and 50 degrees, and wherein a third angle between the second face and the first line perpendicular to the longitudinal axis is between 30 degrees and 50 degrees, the longitudinal axis extending from the contact end to the second end of the main body;
   a spring configured to allow the main body to rotate relative to a stationary object in response to contact with the cargo and to cause the main body to return to a neutral position in response to a lack of contact with the cargo; and
   a pin configured to extend through the central opening such that the main body is configured to rotate about the pin,
   wherein a contact distance from an intersection of the first face and the second face to a center of the central opening is greater than a second distance from the center of the central opening to the second end, and
   wherein the main body defines a pocket between the contact end and the central opening to reduce a moment of inertia during rotation of the main body.

14. The restraint of claim 13, wherein the main body further defines an aperture extending through the main body in the pocket to facilitate draining of fluid from the pocket.

15. The restraint of claim 13, wherein the main body and the spring are configured to rotate past the neutral position in response to the lack of contact with the cargo to a maximum rotation position that is between 45 degrees and 55 degrees.

16. The restraint of claim 15, wherein the first face is configured to form a fourth angle that is between 75 degrees and 105 degrees relative to a second line in response to the main body being in the maximum rotation position, the second line being perpendicular to the longitudinal axis when the main body is in the neutral position.

17. The restraint of claim 16, wherein the fourth angle is between 80 degrees and 100 degrees.

18. The restraint of claim 13, wherein the contact distance is 2 inches plus or minus 10 percent.

19. The restraint of claim 13, wherein the second angle is 39 degrees plus or minus 10 percent.

20. A restraint for use in restraining cargo, the restraint comprising:
   a main body having an elongated shape with a contact end configured to contact and restrain the cargo, a second end opposite the contact end, and a central opening, the contact end defining a first face and a second face such that a first angle between the first face and the second face is at least one of less than or equal to 160 degrees, wherein a third face of the main body extends from the first face and away from the contact end, wherein a fourth face of the main body extends from the third face and toward the second end of the main body, wherein a fifth face of the main body extends from the second face and away from the contact end, wherein a sixth face of the main body extends from the fifth face and toward the second end of the main body, wherein a distance between the third face and the fifth face decreases in a direction toward the contact end, wherein the first face is oriented at a second angle relative to a plane perpendicular to a longitudinal axis of the main body, wherein the third face is oriented at a third angle relative to the plane perpendicular to the longitudinal axis of the main body, wherein the third angle is greater than the second angle, and wherein the longitudinal axis extends from the contact end to the second end of the main body;
   a spring configured to allow the main body to rotate relative to a stationary object in response to contact with the cargo and to cause the main body to return to a neutral position in response to a lack of contact with the cargo; and
   a pin configured to extend through the central opening such that the main body is configured to rotate about the pin.

* * * * *